United States Patent
Braunisch et al.

(10) Patent No.: US 10,124,263 B2
(45) Date of Patent: Nov. 13, 2018

(54) TURN BASED GAME WITH BACKTRACKING

(71) Applicant: KING.COM LIMITED, St. Julians (MT)

(72) Inventors: Jakob Braunisch, Berlin (DE); Matthew Buxton, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 15/365,073

(22) Filed: Nov. 30, 2016

(65) Prior Publication Data

US 2018/0147499 A1    May 31, 2018

(51) Int. Cl.
| | |
|---|---|
| *A63F 13/30* | (2014.01) |
| *A63F 13/822* | (2014.01) |
| *A63F 13/53* | (2014.01) |
| *A63F 13/422* | (2014.01) |
| *A63F 13/2145* | (2014.01) |
| *A63F 13/92* | (2014.01) |

(52) U.S. Cl.
CPC ........ *A63F 13/822* (2014.09); *A63F 13/2145* (2014.09); *A63F 13/422* (2014.09); *A63F 13/53* (2014.09); *A63F 13/92* (2014.09); *A63F 2300/1075* (2013.01); *A63F 2300/204* (2013.01); *A63F 2300/807* (2013.01)

(58) Field of Classification Search
CPC ........ A63F 13/50; A63F 13/53; A63F 13/537; A63F 13/5372; A63F 13/56; A63F 13/57; A63F 13/58; A63F 13/75; A63F 13/822
See application file for complete search history.

(56) References Cited

PUBLICATIONS

"East Front II manual", 1999, Talonsoft, pp. 1-5, 18-31. Retrieved from the Internet <URL:http://www.replacementdocs.com/download.php?view.8440>. 10 pages.*

* cited by examiner

*Primary Examiner* — Lawrence Galka
(74) *Attorney, Agent, or Firm* — Saul Ewing Arnstein & Lehr LLP

(57) ABSTRACT

A computer implemented device has a display which displays game elements of a computer implemented game board. A use selects via a user interface a game element and moves that game element. A processor will update a count value for each move made. When the count reaches a certain value, the use is prevented from making further moves. If a user back tracks, the count value is correspondingly updated.

21 Claims, 9 Drawing Sheets

TURN BASED GAME WITH BACKTRACKING

FIELD OF THE INVENTION

The present invention relates to controlling a user interface responsive to user engagement with displayed elements on the interface of a computer device. The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. A limited display resource provides challenges such as how a user can interact with a particular part of the display. Another challenge relates to how to provide relatively complexity which is able to be rendered in a visual distinct manner on the relatively small display.

Another significant challenge is that of user engagement. Engagement involves designing gameplay and devices to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment. Often this needs to be provided in the context of an environment where only a limited number of resources of a computing device can be used in running the computer implemented game.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear.

One or more of the technical challenges discussed previously arise when introducing complexity into such match games.

SUMMARY OF THE INVENTION

Aspects may provide improved methods of controlling a user interface in the context of a computer-implemented game of a matching type.

According to an aspect, there is provided a computer implemented device having: a display configured to display game elements of a computer implemented game board; a user interface configured to detect user input when a user engages with a game element to thereby select the game element; and at least one processor configured to: in response to the detected user input to select one of the game elements and to move in a turn the selected game element between one and n positions on the game board, where n is an integer greater than one, for each position moved, update a count value, and determine, using the count value, when the selected game element has been moved n positions and prevent the user selected game element from being moved to a new position on the game board in the turn.

The at least one processor may be configured to determine if the game element is moved one or more positions to a preceding position and if so to cause the count value to change to reflect that a number of positions moved has been reduced.

The at least one processor may be configured to determine for a selected game element which has been moved back to an initial position via a path which is in reverse to that taken by the selected game element, that the turn has not been taken.

The at least one processor may be configured to determine that a turn is completed when the game element has moved at least one position and the selected game element is no longer selected by the user via the user interface The at least one processor may be configured to use the count value to cause information indicating a number of positions moved to be displayed on the display.

The information comprising a number of positions moved may comprise a number of possible position moves available in the turn or a number of positions moved.

The at least one processor may be configured to cause the information to be displayed adjacent or on the selected game element on the display.

The at least one processor may be configured for each position moved to switch the selected game element with a game element at the respective position.

The device may comprise a counter providing the count value, the counter comprises one of a count up counter and a countdown counter.

The game elements may each be one of a plurality of different types.

The at least one processor may be configured to determine when a plurality of the game elements satisfy a game rule during the turn and to cause the display to display the plurality of game elements in a visually distinct way as compared to other game elements.

The at least one processor may be configured to, at an end of the turn, cause any plurality of game elements satisfying the game rule to be removed from the displayed game board and to generate replacement game elements for a subsequent turn.

According to another aspect, there is provided a computer implemented method performed by a computer device, the computer device having at least one processor, at least one memory, a display, and a user interface, the method comprising: displaying by the display of game elements of a computer implemented game board; detecting user input at the user interface to select one of the game elements; in response to the detected user input selecting one of the game elements and moving in a turn the selected game element between one and n positions on the game board, where n is an integer greater than one, updating a count value, by the at least one processor, for each position moved; and determining by the at least one processor, in dependence on the count value, when the selected game element has been moved n positions and preventing the user selected game element from being moved to a new position on the game board in the turn.

The method may comprise determining by the at least one processor if the game element is moved one or more positions to a preceding position and if so changing the count value to reflect that a number of positions moved has been reduced.

The method may comprise determining by the at least one processor for a selected game element which has been moved back to an initial position via a path which is in reverse to that taken by the selected game element, that the turn has not been taken.

The method may comprise determining by the at least one processor that a turn is completed when the game element has moved at least one position and the selected game element is no longer selected by the user via the user interface The method may comprise causing by the at least one processor information indicating a number of positions moved to be displayed on the display, said information being dependent on the count value.

The information may comprise a number of possible position moves available in the turn or a number of positions moved.

The information may be displayed adjacent or on the selected game element on the display.

The method may comprise, switching the selected game element with a game element at the respective position for each position moved.

The method may comprise using a counter to provide the count value, the counter comprises one of a count up counter and a countdown counter.

The game elements may each be one of a plurality of different types.

The method may comprise determining by the at least one processor when a plurality of the game elements satisfy a game rule during the turn and displaying on the display the plurality of game elements in a visually distinct way as compared to other game elements.

The method may comprise causing by the at least one processor, at an end of the turn, any plurality of game elements satisfying the game rule to be removed from the displayed game board and generating replacement game elements for a subsequent turn.

According to another aspect, there is provided a non-transitory computer readable storage device storing instructions that, when executed by at least one processor of a computer device causes the at least one processor to perform the following steps: cause displaying by a display of said computer device of game elements of a computer implemented game board; detect user input at a user interface of said computer device to select one of the game elements; in response to the detected user input selecting one of the game elements and moving in a turn the selected game element between one and n positions on the game board, where n is an integer greater than one, update a count value for each position moved; and determine, in dependence on the count value, when the selected game element has been moved n positions and prevent the user selected game element from being moved to a new position on the game board in the turn.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

For a better understanding of some embodiments and to show how the same may be carried into effect, reference will now be made by way of example to the accompanying drawings in which.

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations without departing from the scope of the invention as claimed.

Figure 4:
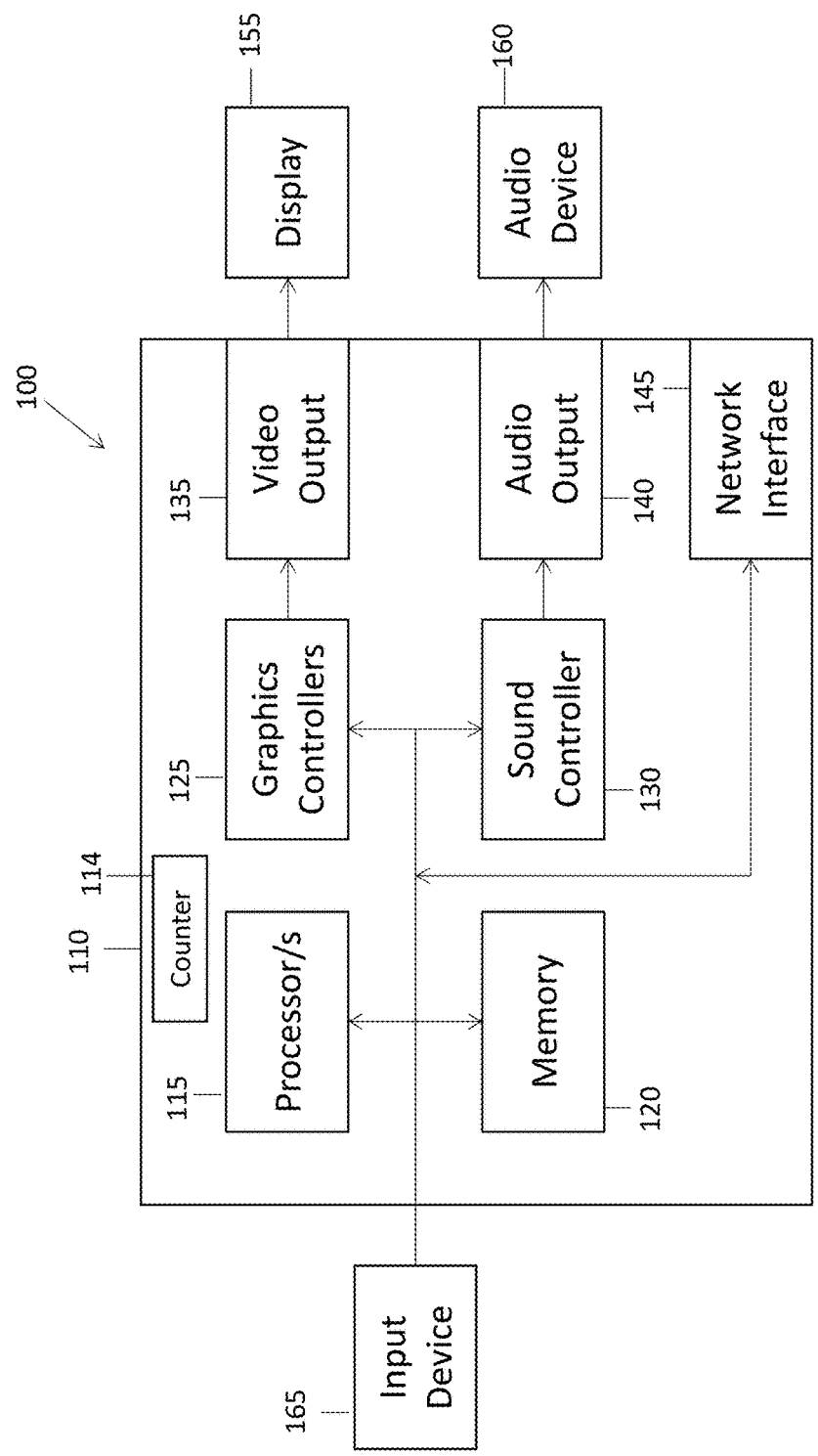
FIG. 4 shows an example user device in which some embodiments may be provided.

A schematic view of a user device 100 according to an embodiment is shown in FIG. 4. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

The user device has a move counter 114 which will be described in more detail later. The move counter may be implemented in hardware, software, or by a combination thereof. The counter may be implemented by firmware.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 3:
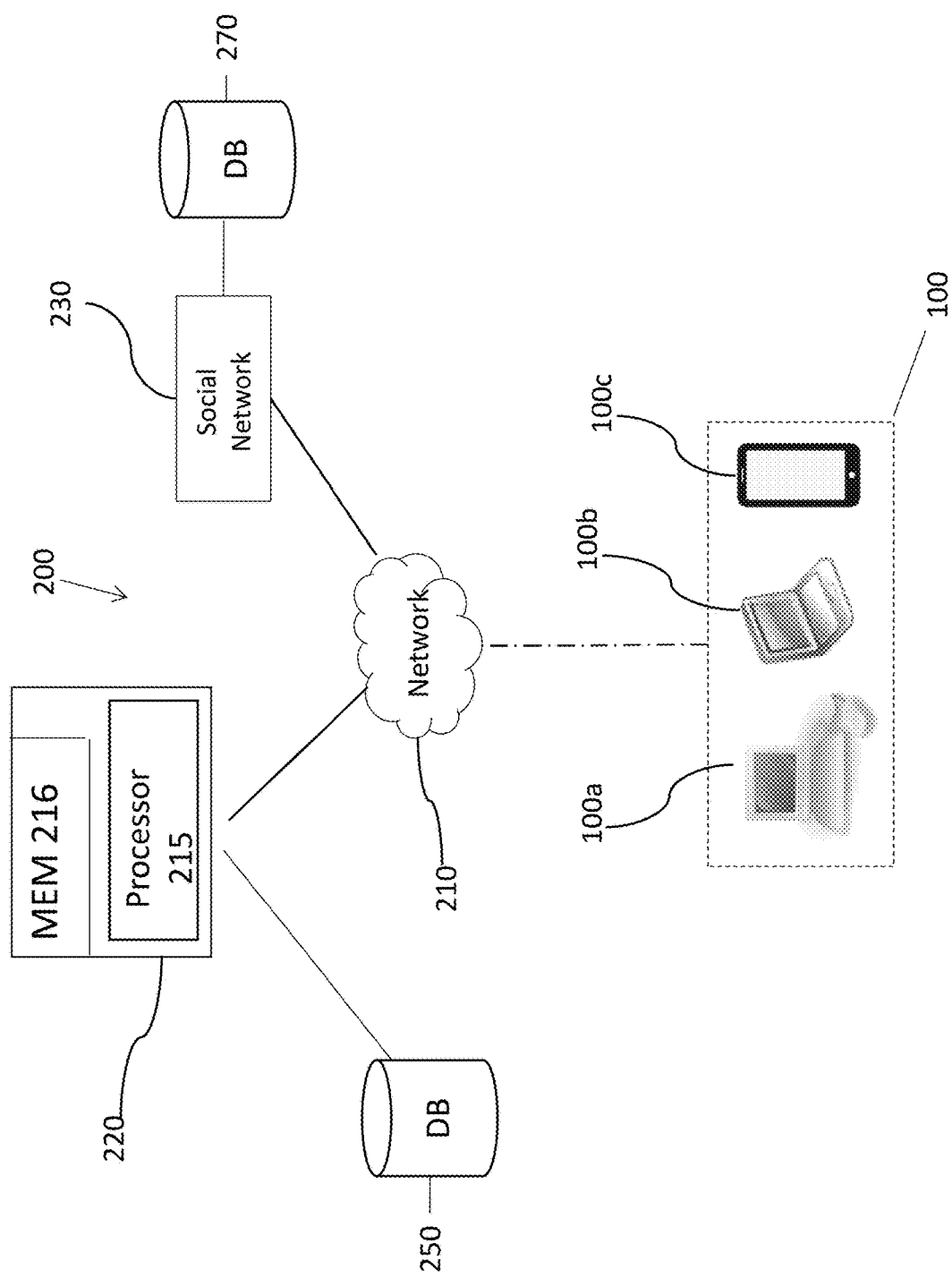
FIG. 3 shows an example system in which some embodiments may be provided.

FIG. 3 schematically shows a system 200 according to an embodiment. The system 200 comprises a server 220 which may store or be in communication with database 250. The database may store one or more of game player's details, profiles, statistics etc. In practice, one or more databases 250 may be provided. Where more than one server 220 is provided, the database(s) 250 may be provided in one database 250 or across two or more servers. The server 220 may also have a games data function. This may comprise one or more units of memory 216 to store the computer game program, user behaviour data and a processor 215 to run the games program and process the user behaviour data.

The server 220 may communicate via, for instance, the internet 210 to one or more client or user devices 100, shown in FIG. 13 by way of example as user devices 100*a*, 100*b* and 100*c*, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer program that is stored in the memory of the user device and is run on the processor of the user device. However, the server 320 may handle some elements of the game in some embodiments. By way of example only, a Java game applet may be provided to the user device 200 and the locally running Java applet will generate, for example, the graphics, sounds, and user interaction for the game play on the user device. Some data may be fed back to the server to allow interaction with other players 305. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 1A:
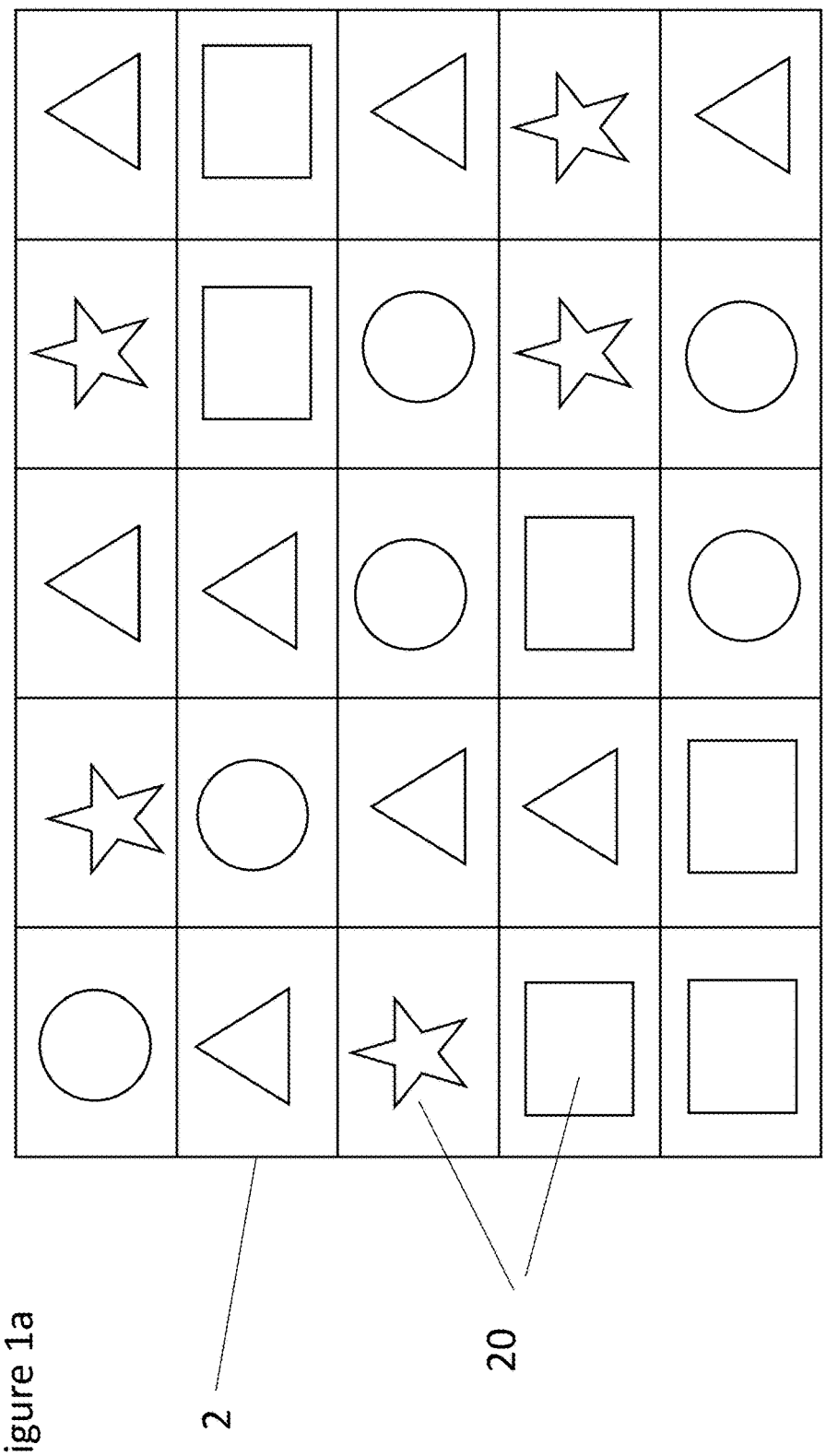
FIGS. 1a to 1e show schematic diagrams of a game board of a match game illustrating various examples of moves that can be made.

FIG. 1*a* illustrates a game board 2 with a plurality of game elements 20. The game board and game elements are displayed on the display of the user device. The display may be a touch screen. The game elements will be one of a plurality of different types. In the example shown, the game elements have different shapes. Alternately or additionally the game elements may have a different visual appearance such as colour and/or pattern and/or picture. For example the game elements may have pictures of different animals, candies, vegetables or the like.

The aim of the game is to swap or switch game elements with each other to make moves on the game board. To achieve game goals, the player has to make moves that create matches of at least three of the same game element. In doing so, the player gains points, for example, and the matched game elements are removed. As a result new game elements provided. The game elements may fall into place from the top of the game board in order to fill any spaces created. Alternatively or additionally, the physics can vary so that the speed and/or direction of replacement game elements can alter.

It should be appreciated that there is a technical challenge to create a game which on the one hand has a relatively small game board but at the same time is engaging. The game board is relatively small in order to allow the game to be played on a mobile phone or smart phone, in some embodiments.

In the arrangement of FIGS. 1*a* to 1*e*, the game has a free switcher core mechanic. In a free switcher, a selected game object can be moved around freely in any direction. In some embodiments, the amount of switches that can be done within one move is limited.

Figure 1B:
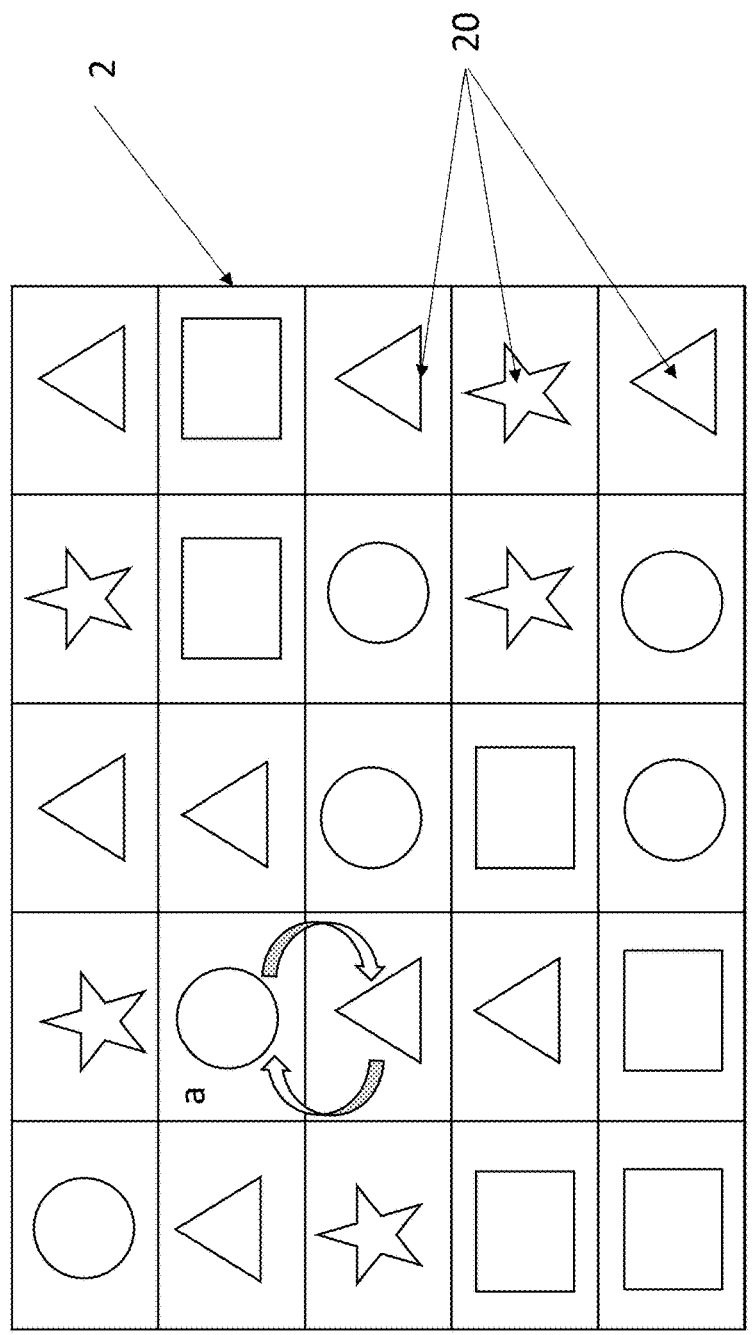

Reference is made first to the move referenced a in FIG. 1*b*. In the move, a triangle is moved to swap or switch places with a circle in an adjacent game board position. In particular the triangle has been selected by the user via the user input. In the case of a touchscreen, the triangle may be selected by the user touching that game element and dragging their finger to the position occupied by the circle. The selected triangle game element is dragged with the user's finger to the new position and the circle swaps or switches to the position previously occupied by the triangle.

Figure 1C:
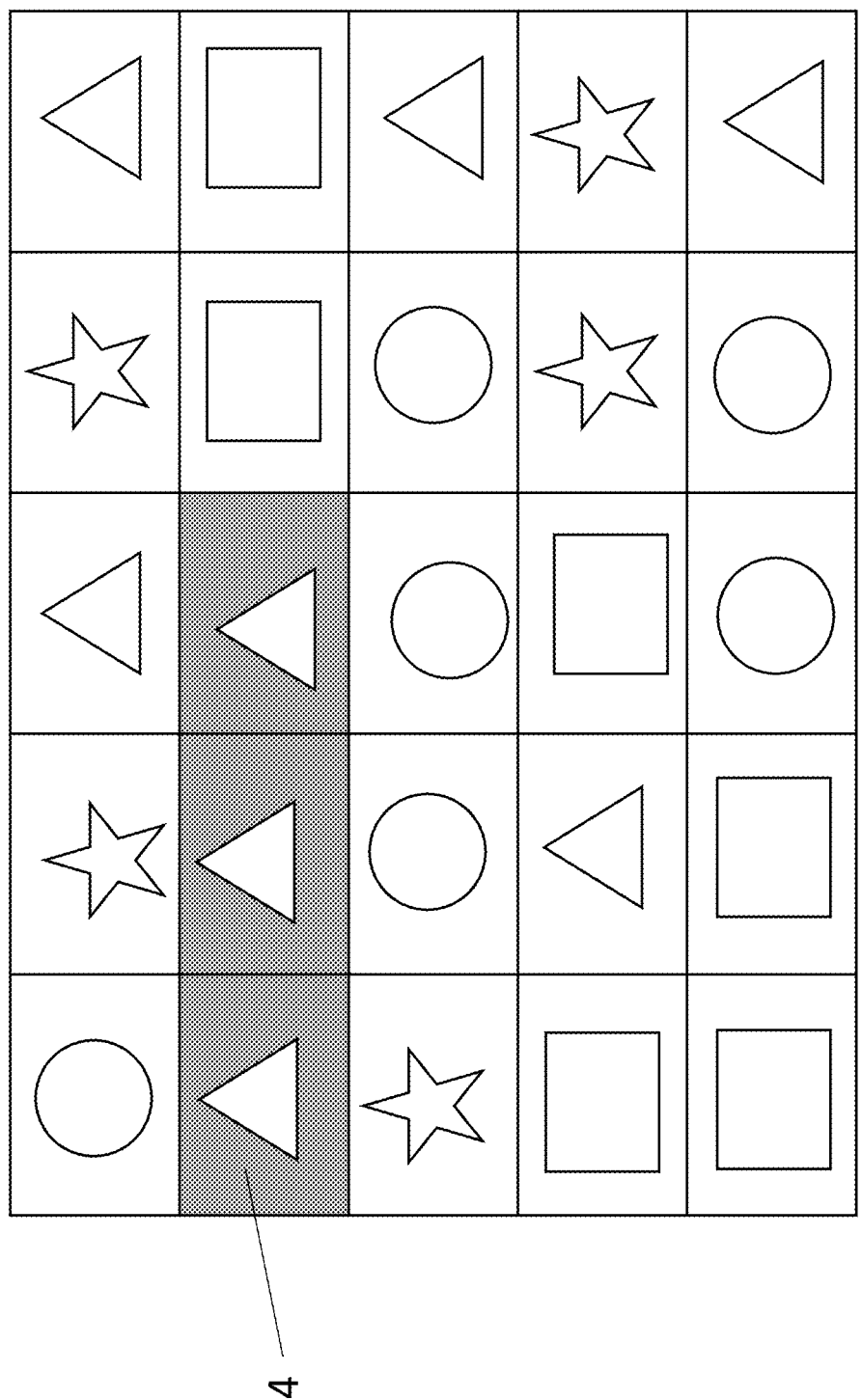

FIG. 1*c* shows the game board after this move has been completed. As referenced by the highlighting 4 of the three triangles in a row, a match has been made. In practice any suitable highlighting of the game elements of the match may be used. Thus the swapping of the triangle with the circle has provided a match of three triangles. In some embodiments, as long as the user has still selected the triangle so the turn is not over, any match which is made will be highlighted. The continued selection of a game object may be by the continued selection via the user input of the game object. Where the display is a touch screen, this may be by the user continuing to touch the area of the display which displayed the game object in question. In some embodiments those game elements which match are displayed in a visually distinct manner. For example, those game elements which are in a match are highlighted.

When the user input indicates that the move is completed, any matches which are present at the end of the move will be removed. For example, in the case of a touch screen the user may remove their finger from the display to complete the move. In particular the game elements making up the one or more matches may be removed. In some embodiments, as soon as the user removes their finger from the touch screen, this is considered to be the end of the move and the matched game elements are removed. The board will be replenished with new game elements. Removal of the matched game elements may result in further matches, those matched game elements also being removed. For example, when the matched game elements are removed, the game elements above the removed game elements move down to fill the space occupied by the removed game elements and new game elements will be added to fill up the game board. The new arrangement of game elements may result in one or more further matches being made and so on.

Figure 1D:
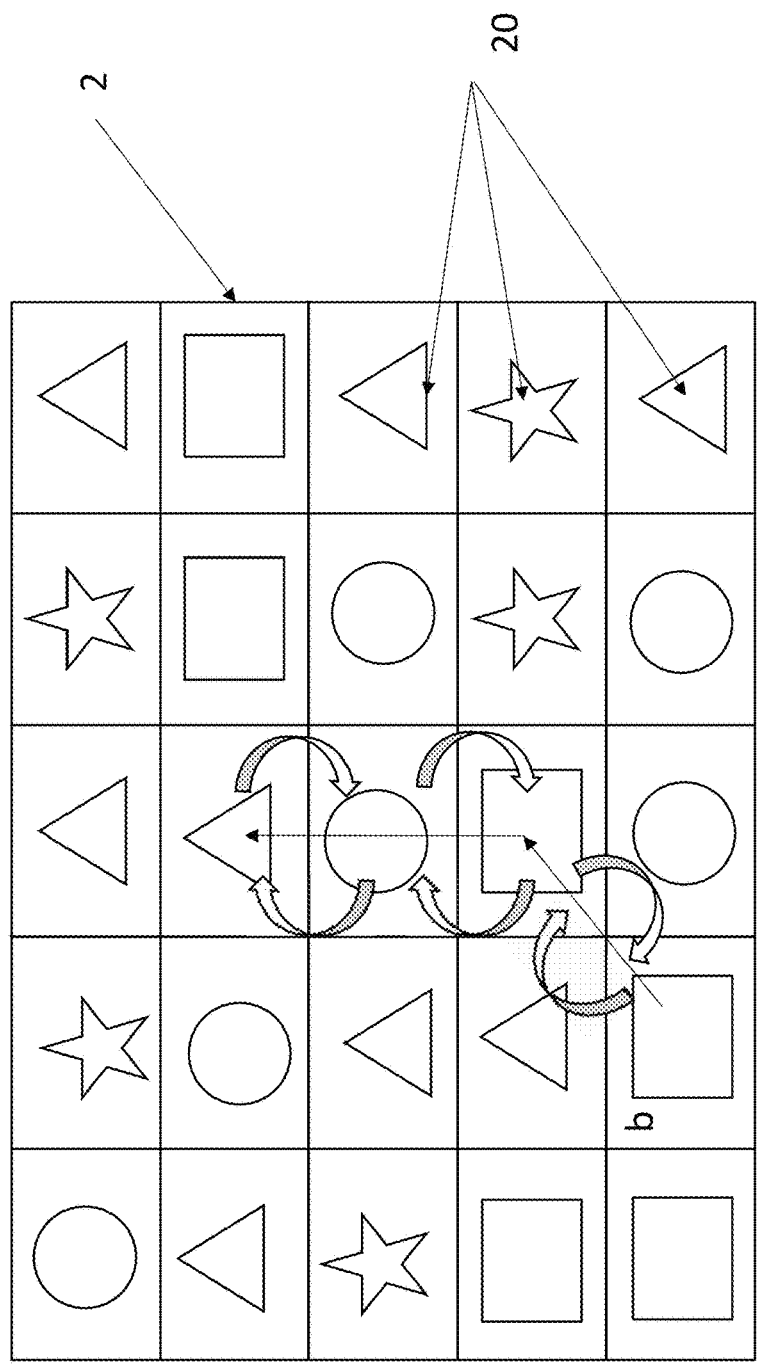
Figure 1E:
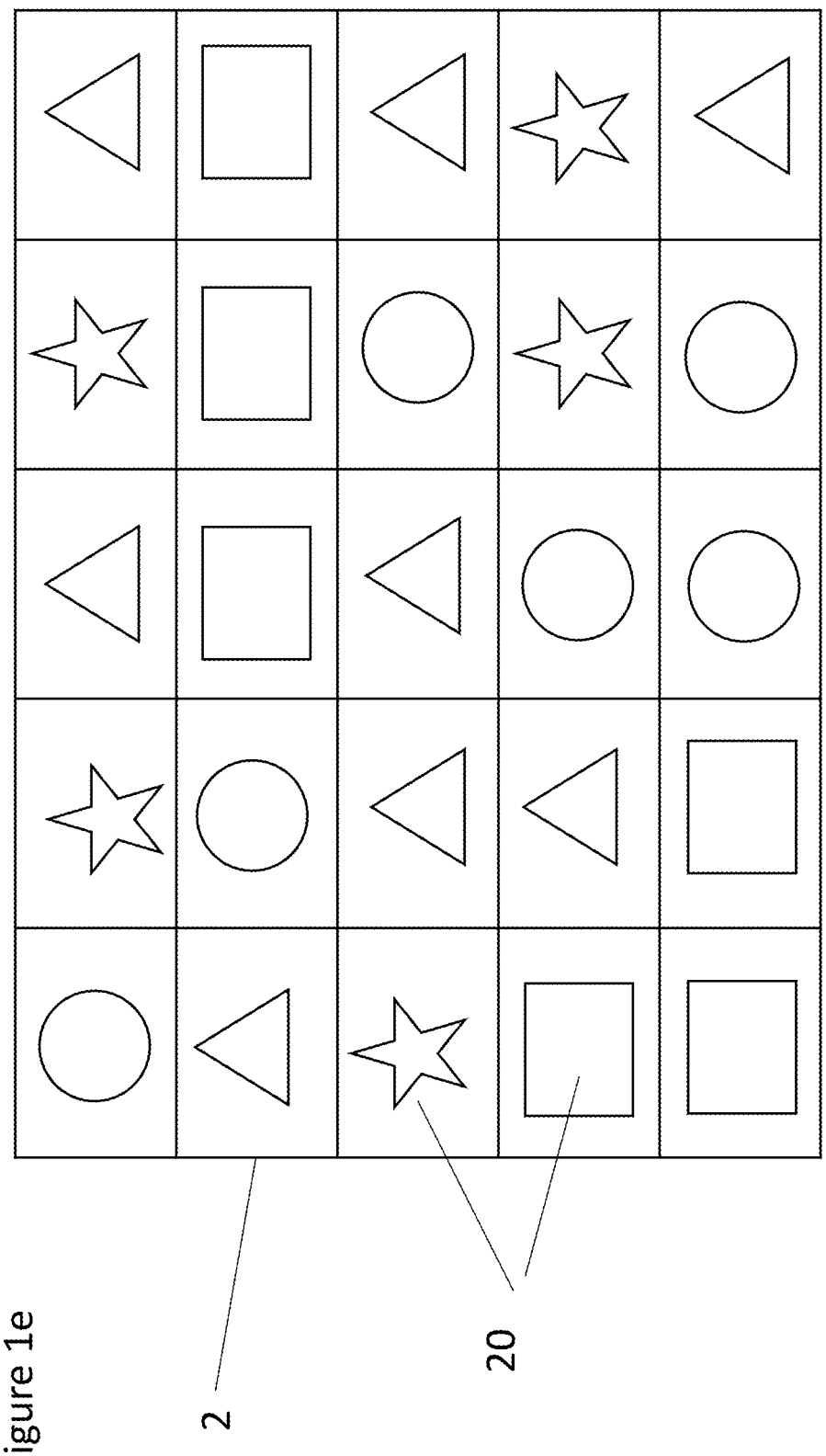

Reference is now made to the move referenced b in FIG. 1d. A square is selected by the user via the user input and is moved diagonally. In this case another square is in that position. The selected square is moved to the new position and the another square moves to the initial position of the selected square. The selected square is then moved one more position to an adjacent square which has a circle, the circle moving to the position previously occupied by the square. It should be appreciated that during this turn or move, the square remains continuously selected until released by the user via the user input. FIG. 1e shows the position of the game elements after move b has been completed.

In some embodiments, each move that a user makes can have up to n switches or swaps. n can be any suitable number. In some embodiments, there are a number of different levels of the game and different levels can have a different value for n. In some embodiments, n can have a value between 2 and 10. However, it should be appreciated that in some embodiments, n may be 1. n may of course be greater than 10.

The game board may be of any suitable size and in some embodiments may be 7×6 game elements or similar. This may be suitable to allow the game to be played using the touch screen of a mobile phone or smart phone. Of course it should be appreciated that other embodiments may have different sizes of game board. In some embodiments, different levels may have different sized game boards.

Thus a player moves a game element by touching the game element displayed on the touch screen display and dragging that game element in the direction they want. This is done by the user moving their finger across the display in the required direction. The game element which is selected moves along with the user's finger movement across the display.

A player has a number of available switches that decrease every time a player moves the game element one full space on the grid. The counter is configured to count the number of switches made. This can be done by a count up function or a countdown function.

The player can switch freely while they still have available switches remaining. Selecting a game element, moving the game element and releasing the game element defines one turn or move. When a player moves a game element, it will swap positions with the game element it moves toward.

In some embodiments, game elements may swapped diagonally and this is counted as one switch. In other embodiments, a diagonal switch is counted as two switches (a horizontal switch and a vertical switch).

In some embodiments, there may be one or more game elements on the board which cannot be moved. The selected game element would have to be moved around the immovable game element.

In some embodiments, provided that a user has not completed a move or turn, the user can back track. Each switch which is backtracked will result in the counter being altered (either decremented in the case of a count up counter or incremented in the case of a countdown counter) to reflect an increased number of available switches. If the user back tracks to the original start position at the beginning of the turn or move, the counter will be back at its initial value. It should be appreciated that the user has to undo a previous switch in order to backtrack. Each back track switch will result in the counter being altered and effectively allows a move to be tried out before the user has to decide to make a particular move.

In some embodiments, any 3-in-a-row game elements of the same type will disappear. Once the player runs out of switches the board resolves in the order that the player completed a match 3 or more. In other words, if a switch is made which results in a match, that match and any other matches on the game board at the time will be removed. The game elements will then shift in response to the removal of the matching game elements and new game elements will be added. The refilled game board may have one or more matches. Those matching game elements are removed and the process is repeated until there is a game board with no matches. The more game elements cleared at once, the higher damage/recovery caused in some embodiments. Making multiple matches in one turn produces combinations which may add multipliers to damage/recovery effects.

The features allow the player to play more strategically. In some embodiments, there is no time limit, rather allowing the user to try out options before finally deciding on a move.

Figure 2:
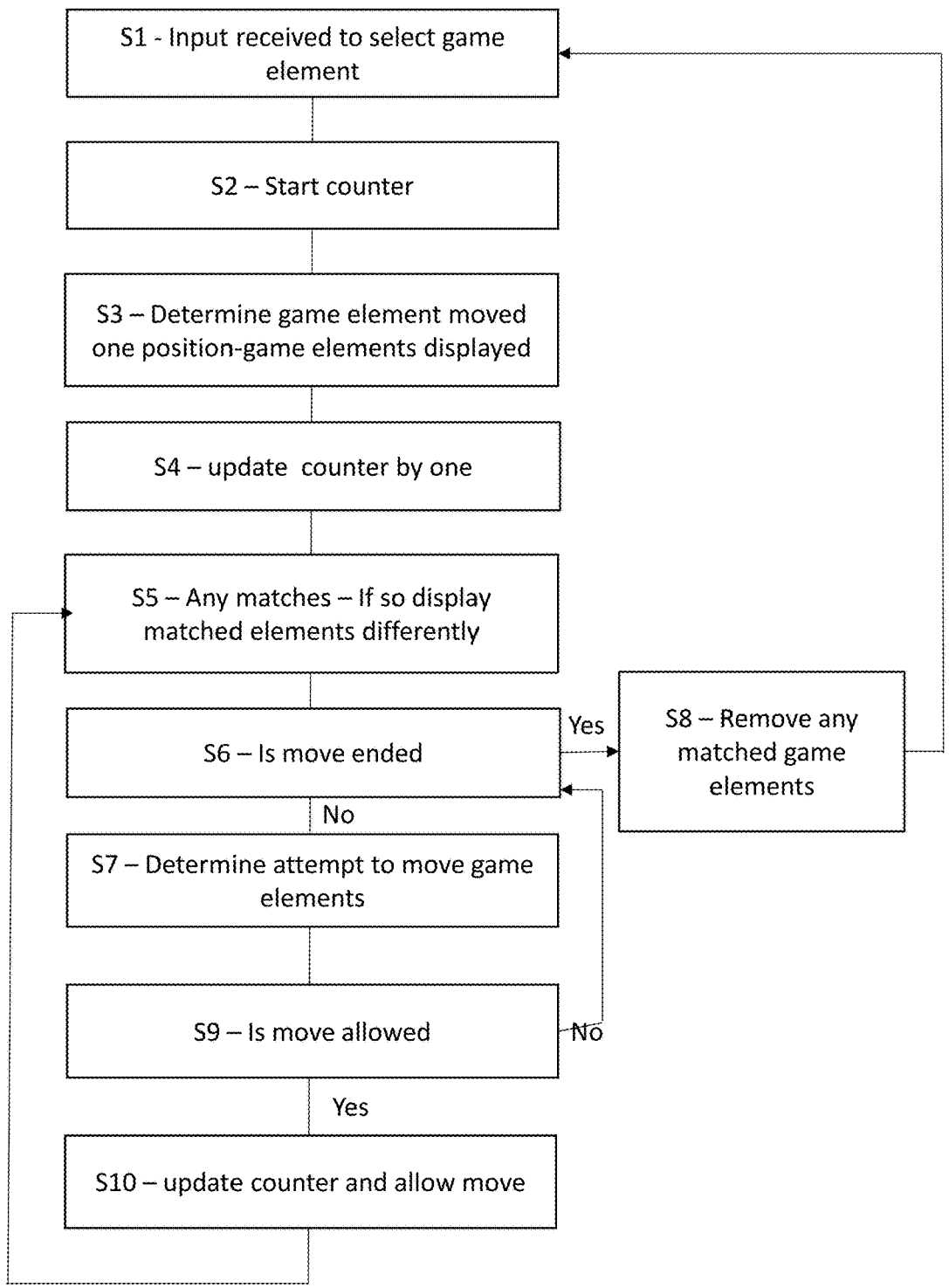
FIG. 2 shows a method according to an embodiment.

Reference is made to FIG. 2 which shows a method of an embodiment.

In step S1, a user input is received via the user interface. This user input selects a game element. It should be appreciated that in some embodiments, this may be the user putting their finger on the selected game element displayed on a touch screen. Other methods of selecting and moving a game element may be used in alternative embodiments.

In step S2, the counter is started. In some embodiments, the counter may be a count up counter. In that case, the counter will start from zero. In other embodiments, the counter may be a countdown counter. In the example which will now be described with reference to FIG. 2, the counter is a countdown counter. In this example, the initial count is set to n which represents the maximum number of switches in a move. In this example n may be 5. However, as mentioned previously, the initial count value can be any suitable count value. This count represents the maximum number of switches which can be made in one turn or move.

Alternative embodiments may use a count up counter where the initial value may be 0. The current value of the counter may be compared with a threshold which defines the maximum number of moves.

In step S3, a determination is made as to whether the selected game element has moved one position. One position is considered to be movement of the user's finger from the area associated with the selected game element to an area of an adjacent game element. In the example shown, the user is able to move to diagonally, vertically or horizontally by one position and this is counted as one move. In other embodiments, the user may be prevented from making a diagonal movement which counts as a single move. In this latter embodiment, a diagonal movement can be achieved by the combination of a horizontal and a vertical move, thus requiring two moves.

In step S3, the display is controlled so that the game element which has moved is displayed in the new position and the game element of which was in the new position is displayed in the original position of the selected game element. In other words, the game elements have been swapped or switched.

In step S4, the counter is updated by 1.

In step S5, it is determined if the switch has resulted in one or more matches being made. In some embodiments, a match occurs when at least three game elements have the same characteristic and satisfy a given rule. However it should be appreciated that different rules may be used. Those game elements which are in a match are caused to be displayed differently from those game elements which are not in a match.

In step S6, it is determined if a move is ended. In some embodiments, this determination may be made in dependence on whether the selected game element is no longer selected. In the touchscreen scenario, the user will no longer be touching the initially selected game element.

If it is determined that the move has ended, the next step is step S8 where any matching game elements are removed from the displayed game board and the method loops back to step S1 for the next move of the user.

If it is determined that the move has not ended, the next step is step S8, where a determination is made that the user input is attempting to move a game element one position. The determination will be that a game element has been selected and the user input is attempting to move the game element.

In step S9 a determination is made as to whether the move is allowed. This determination will determine how the move will updated the counter. The move will always be allowed if the determination is that there is backtracking, in other words, the user input moved the selected game element to its immediately previous position or is retracing its path back to an initially selected game element. If the move will update the counter to reflect an additional move, then a determination is made as to whether this additional move exceeds the maximum number of moves. If so, the move is not allowed. If not, the move is permitted.

In some embodiments, to facilitate back tracking, the preceding position on the path may be highlighted so that the user can retrace the path of the selected game element. To facilitate this, the path which the selected game element has followed to reach its current position may be highlighted.

In some embodiments, where the limit number of moves has been made, the processor may be configured to control the display to reflect this. For example, the game element which is selected may be prevented from being moved in response to the user input.

If the move is not allowed, the next step is step S6.

If the move is allowed, the next step is step S10 in which the results in the game element being shown in the new position and the counter being updated. This will depend on whether the counter is an incremental counter or a decremented counter move on the one hand and whether or not the move is a backtracking move.

Step S10 is then followed by step S5.

In some embodiments, a count value may be displayed for each switch of a turn made. The count may be a count up indicating the number of switches made or may be a countdown indicating a number of switches in a move remaining. The count value may be displayed on the display at any suitable location. In some embodiments, the count value can be displayed adjacent the game board. In other embodiments, the count value may be displayed on the game board. In one embodiment, the count value is displayed such that it is clear what was the previously selected game element (as compared to the current game element). This may be used to facilitate backtracking. In other embodiments, the count value may be displayed adjacent the currently selected game element. In one modification, as the user input moves from the currently selected game element to a next selected game element, the count value will change. This may be to increase or decrease the count value depending on whether a count up or count down mechanism is being used and whether the move is a backtrack move or is a new move.

Using this count information, the user is able to determine if the selected game element is being moved to a new position or if the game element is retracing or backtracking along the path taken by the selected game element. Retracing will increase the number of available positions the selected game element may be moved in a turn again.

Figure 5:
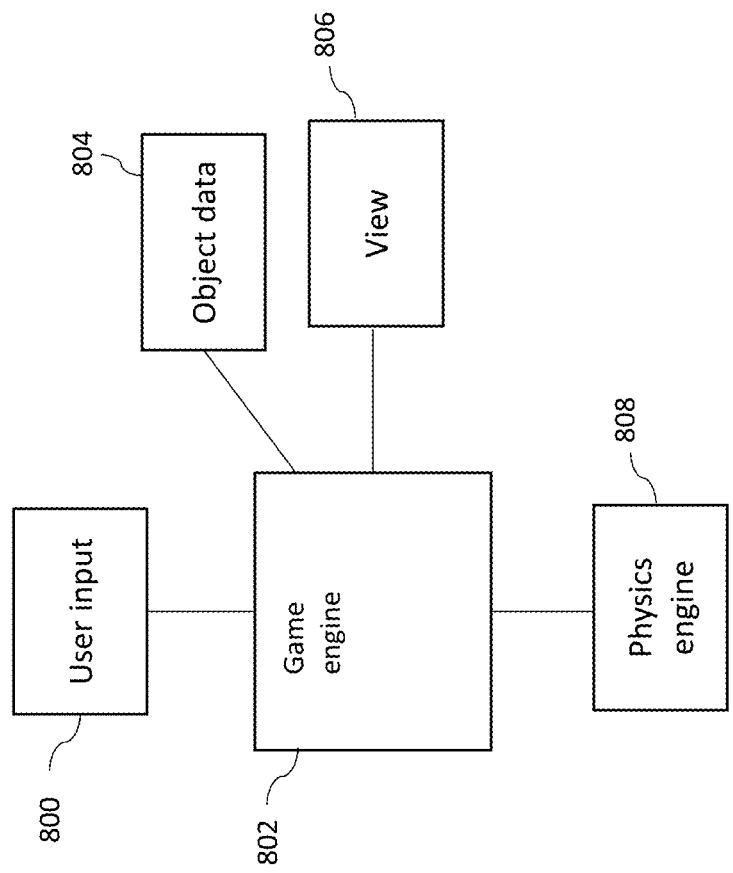
FIG. 5 is a schematic diagram showing the modules and functions associated with carrying out the operating of embodiments.

Reference is made to FIG. 5 which schematically shows the functional blocks of an embodiment, which may enable game play such as discussed previously. A user input block 800 is shown. This captures the user input and feeds the input to a game engine 802. In the context of the game of some embodiments, this user input may be which tiles are switched by a user. This user input can be via any suitable user interface, such as discussed earlier.

The game engine 802 will process the information provided by the user input. The game engine 802 (for example a game model) will determine if a valid combination has been made.

Each game element has object data associated therewith. The object data 804 may be stored in any suitable memory location. In some embodiments, the object data may be provided by the data structure described previously. In some embodiments, the object data may be considered to be part of the game engine and in other embodiments may be considered to be outside the game engine. The object data may provide information as to the properties of a game element. These properties can include attribute information such as colour and/or whether or not a game element has a particular function such as a so-called booster function. The object data may include the position data, that is, information representing the position of the game element in the displayed image.

In some embodiments, the game engine will check if the game element satisfies the rule or rules for a valid match. The rule or rules define whether or not a match condition has been satisfied. The match condition will be dependent on the game. In some embodiments, a match condition will be satisfied if the game element are arranged to provide a sequence of at least three adjacent game elements sharing at least one same characteristic. In some embodiments, the game elements of the sequence are removed.

Thus, the game engine will be in control of the matching mechanism. The game engine will have access to data for each game element including its position and the at least one characteristic associated with the game element, and will be able to determine if a match condition has been met. If a match condition is met, the game elements in the match may be removed.

It should be appreciated that in other embodiments, the game may use any type of match mechanic such as switching, sliding or linking. The game elements may be any suitable game element and in some embodiments may be letters. In that scenario a match may occur when the letters match a word. Preferably the word is at least three letters long.

A physics engine 808 is provided which is configured to control the movement of moving game elements on the display.

The physics engine 808 may be part of the game engine 802.

A view function 806 uses of the object data to provide the displayed image with which the user is able to view and/or interact.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented device having:
a display configured to display game elements of a computer implemented game board;
a user interface configured to detect user input when a user engages with a game element to thereby select the game element; and
at least one processor configured to:
in response to the detected user input selecting one of the game elements and moving in a turn the selected game element between one and n positions on the game board, where n is an integer greater than one, for each position moved, update a count value, the at least one processor being configured for each position moved to switch the selected game element with a game element at the respective position; and
determine, in dependence on the count value, when the selected game element has been moved n positions and prevent the user selected game element from being moved to a new position on the game board in the turn.

2. The device as claimed in claim 1, wherein the at least one processor is configured to determine if the game element is moved one or more positions to a preceding position and if so to cause the count value to change to reflect that a number of positions moved has been reduced.

3. The device as claimed in claim 1, wherein the at least one processor is configured to determine for a selected game element which has been moved back to an initial position via a path which is in reverse to that taken by the selected game element, that the turn has not been taken.

4. The device as claimed in claim 1, wherein the at least one processor is configured to determine that a turn is completed when the game element has moved at least one position and the selected game element is no longer selected by the user via the user interface.

5. The device as claimed in claim 1, wherein the at least one processor is configured to use the count value to cause information indicating a number of positions moved to be displayed on the display.

6. The device as claimed in claim 5, wherein the information comprising a number of positions moved comprises a number of possible position moves available in the turn or a number of positions moved.

7. The device as claimed in claim 5, wherein the at least one processor is configured to cause the information to be displayed adjacent or on the selected game element on the display.

8. The device as claimed in claim 1, comprising a counter providing the count value, the counter comprises one of a count up counter and a countdown counter.

9. The device as claimed in claim 1, wherein the game elements are each one of a plurality of different types.

10. The device as claimed in claim 1, wherein the at least one processor is configured to determine when a plurality of the game elements satisfy a game rule during the turn and to cause the display to display the plurality of game elements in a visually distinct way as compared to other game elements.

11. The device as claimed in claim 1, wherein the at least one processor is configured to, at an end of the turn, cause any plurality of game elements satisfying a game rule to be removed from the displayed game board and to generate replacement game elements for a subsequent turn.

12. A computer implemented method performed by a computer device, the computer device having at least one processor, at least one memory, a display, and a user interface, the method comprising:
displaying by the display of game elements of a computer implemented game board;
detecting user input at the user interface to select one of the game elements;
in response to the detected user input selecting one of the game elements and moving in a turn the selected game element between one and n positions on the game board, where n is an integer greater than one, updating a count value, by the at least one processor, for each position moved, wherein for each position moved, switching the selected game element with a game element at the respective position; and
determining by the at least one processor, in dependence on the count value, when the selected game element has been moved n positions and preventing the user selected game element from being moved to a new position on the game board in the turn.

13. The method as claimed in claim 12, comprising determining by the at least one processor if the game element is moved one or more positions to a preceding position and if so changing the count value to reflect that a number of positions moved has been reduced.

14. The method as claimed in claim 12, comprising determining by the at least one processor for a selected game element which has been moved back to an initial position via a path which is in reverse to that taken by the selected game element, that the turn has not been taken.

15. The method as claimed in claim 12, comprising determining by the at least one processor that a turn is completed when the game element has moved at least one position and the selected game element is no longer selected by the user via the user interface.

16. The method as claimed in claim 12, comprising causing by the at least one processor information indicating a number of positions moved to be displayed on the display, said information being dependent on the count value.

17. The method as claimed in claim 16, wherein the information comprises a number of possible position moves available in the turn or a number of positions moved.

18. The method as claimed in claim 16, wherein the information is displayed adjacent or on the selected game element on the display.

19. A non-transitory computer readable storage device storing instructions that, when executed by at least one processor of a computer device causes the at least one processor to perform the following steps:

cause displaying by a display of said computer device of game elements of a computer implemented game board;

detect user input at a user interface of said computer device to select one of the game elements;

in response to the detected user input selecting one of the game elements and moving in a turn the selected game element between one and n positions on the game board, where n is an integer greater than one, update a count value for each position moved, wherein for each position moved, switching the selected game element with a game element at the respective position; and determine, in dependence on the count value, when the selected game element has been moved n positions and prevent the user selected game element from being moved to a new position on the game board in the turn.

20. A computer implemented method performed by a computer device, the computer device having at least one processor, at least one memory, a display, and a user interface, the method comprising:

displaying by the display of game elements of a computer implemented game board;

detecting user input at the user interface to select one of the game elements;

in response to the detected user input selecting one of the game elements and moving in a turn the selected game element between one and n positions on the game board, where n is an integer greater than one, updating a count value, by the at least one processor, for each position moved; and determining by the at least one processor, in dependence on the count value, when the selected game element has been moved n positions and preventing the user selected game element from being moved to a new position on the game board in the turn, wherein said method comprises determining by the at least one processor if the game element is moved one or more positions to a preceding position and if so changing the count value to reflect that a number of positions moved has been reduced.

21. A computer implemented method performed by a computer device, the computer device having at least one processor, at least one memory, a display, and a user interface, the method comprising:

displaying by the display of game elements of a computer implemented game board;

detecting user input at the user interface to select one of the game elements;

in response to the detected user input selecting one of the game elements and moving in a turn the selected game element between one and n positions on the game board, where n is an integer greater than one, updating a count value, by the at least one processor, for each position moved; and determining by the at least one processor, in dependence on the count value, when the selected game element has been moved n positions and preventing the user selected game element from being moved to a new position on the game board in the turn, wherein said method comprises determining by the at least one processor for a selected game element which has been moved back to an initial position via a path which is in reverse to that taken by the selected game element, that the turn has not been taken.

* * * * *